United States Patent
Solomon

(10) Patent No.: US 7,302,404 B2
(45) Date of Patent: Nov. 27, 2007

(54) METHOD AND APPARATUS FOR A NETWORK SYSTEM DESIGNED TO ACTIVELY MATCH BUYERS AND SELLERS IN A BUYER-DRIVEN ENVIRONMENT

(75) Inventor: Amiad Solomon, Jerusalem (IL)

(73) Assignee: Auctionkiller, Jerusalem (IL)

( * ) Notice: Subject to any disclaimer, the term of this patent is extended or adjusted under 35 U.S.C. 154(b) by 1246 days.

(21) Appl. No.: 09/780,469

(22) Filed: Feb. 12, 2001

(65) Prior Publication Data

US 2002/0023042 A1     Feb. 21, 2002

Related U.S. Application Data

(60) Provisional application No. 60/182,213, filed on Feb. 14, 2000.

(51) Int. Cl.
    *G06Q 40/00*     (2006.01)
(52) U.S. Cl. .......................................... 705/26; 705/27
(58) Field of Classification Search .................. 705/37, 705/26, 27
    See application file for complete search history.

(56) References Cited

U.S. PATENT DOCUMENTS

| | | | | |
|---|---|---|---|---|
| 5,283,731 A | * | 2/1994 | Lalonde et al. ................ | 705/1 |
| 5,592,375 A | * | 1/1997 | Salmon et al. ................. | 705/7 |
| 5,974,406 A | * | 10/1999 | Bisdikian et al. ............. | 707/1 |
| 6,112,181 A | * | 8/2000 | Shear et al. .................... | 705/1 |
| 6,119,101 A | * | 9/2000 | Peckover ...................... | 705/26 |
| 6,253,188 B1 | * | 6/2001 | Witek et al. .................. | 705/26 |
| 6,397,219 B2 | * | 5/2002 | Mills ........................... | 707/10 |
| 6,665,659 B1 | * | 12/2003 | Logan ........................... | 707/3 |

* cited by examiner

*Primary Examiner*—Jagdish N. Patel
(74) *Attorney, Agent, or Firm*—Eitan Law Group

(57) ABSTRACT

The present invention is a method for using a computer connected to a network to match buyers and sellers, the method including: receiving a buyer request from a buyer, the buyer request including a request to purchase a good or service, having the computer search sites on the network for sell ads from sellers, each of the sell ads referring to an advertised good or advertised service, matching the buyer request with at least one of the sell ads, and notifying the associated seller for each matched sell ad that the buyer has requested a good or service similar to the advertised good or advertised service advertised in the matched sell ad. According to some embodiments of the method and system, both a seller and a buyer may be identified and matched up without either sending a request.

3 Claims, 3 Drawing Sheets

METHOD AND APPARATUS FOR A NETWORK SYSTEM DESIGNED TO ACTIVELY MATCH BUYERS AND SELLERS IN A BUYER-DRIVEN ENVIRONMENT

CONTINUATION DATA

This Patent Application claims priority from U.S. Provisional Patent Application Ser. No. 60/182,213, filed on Feb. 14, 2000, which is incorporated herein by reference.

FIELD OF THE INVENTION

The present invention relates to electronic commerce using electronic networks.

BACKGROUND OF THE INVENTION

Internet related businesses are among the fastest growing industries in the world. One of the preferred services for consumers on the Internet is the sale of commodities through auction and other trading sites. Online auctions are becoming the preferred platform for doing business for more and more people.

Today's consumer-to-consumer (C2C) auction sites heavily favor sellers because sellers set the terms and prices are constantly driven higher by bidders. It would be beneficial to buyers to have a buyer-oriented service in which sellers compete for buyers, hence driving the price down.

BRIEF DESCRIPTION OF THE DRAWINGS

The present invention will be understood and appreciated more fully from the following detailed description taken in conjunction with the appended drawings in which.

DETAILED DESCRIPTION OF THE PRESENT INVENTION

The present invention is directed to a system that searches for and notifies sellers of a potential buyer for goods or services offered for sale by the sellers. Sellers can generate offers through the system. The buyer and all prospective sellers will see the products for sale and the best offers, thereby allowing sellers to offer a lower price and/or better terms. The bidding process drives the price down—thus benefiting the consumer.

The goods or services may be, for example, merchandise and wares, real estate, software, an enabling password, access to information.

Figure 1:
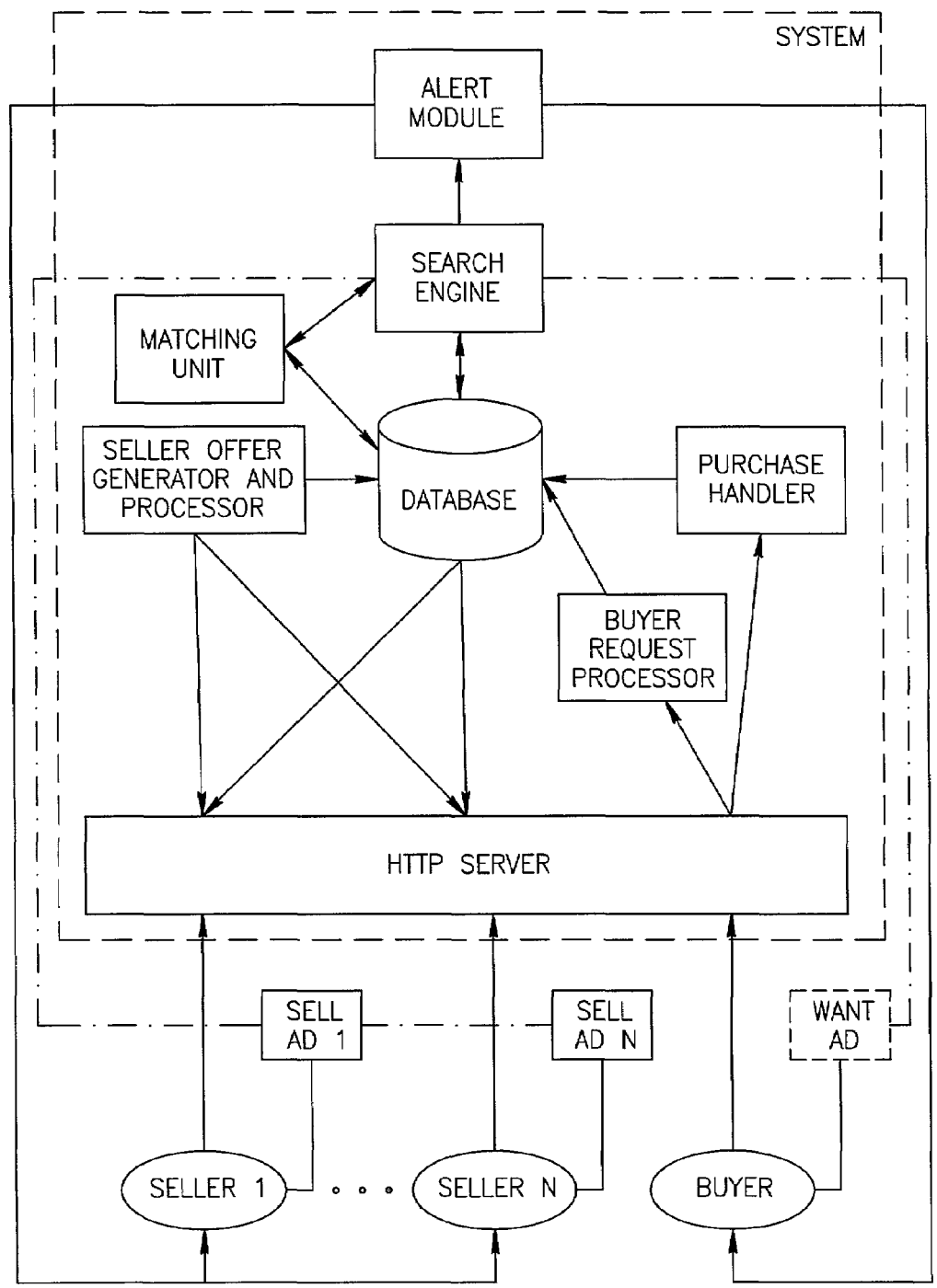
FIG. 1 is a schematic illustration of a system according to an embodiment of the present invention.

Sellers are attracted to the system because they know the buyer is serious and ready to make a purchase otherwise the buyer would not have responded to their sale offer Reference is now made to FIG. 1, which is a schematic illustration of a system according to an embodiment of the present invention. The system comprises a hypertext transfer protocol (HTTP) server, a search engine, a matching unit, an alert module and a database. The system also comprises a buyer request processor and a seller offer generator and processor. The system enables sellers 1 through N who have posted "sell ads" 1 through N, respectively, on a network such as the Internet, to compete for a buyer, who may optionally have posted a want ad on the network.

Three embodiments of using the system of FIG. 1 will be described hereinbelow in FIG. 2. In each of these embodiments, the components of the system shown in FIG. 1 perform identical or similar actions. The HTTP server provides the interface of the system to buyers and sellers. Via the HTTP server, the buyer can send raw buyer requests, which are processed by the buyer request processor and stored in the database. The buyer can also see via the HTTP server a list of matched sell ads and the current status of seller offers for the buyer request. Via the HTTP server, sellers can generate seller offers, which are received and processed by seller offer generator and processor and stored in the database. The seller can also see via the HTTP server the current status of seller offers for the buyer request. When a buyer is ready to select at least one of the seller offers, the selection is made via the HTTP server and provided to the purchase handler for handling.

The search engine actively searches sell ads posted by sellers on the network for matches with processed buyer requests. In an alternative embodiment, the search engine actively searches want ads posted by buyers on the network and actively searches sell ads posted by sellers on the network for matches with the want ads. The searches are indicated in FIG. 1 by dashed-and-dotted lines. The search engine makes use of the matching unit for determining which sell ads match which buyer requests (and/or want sell ads) and to what degree.

Figure 2A:
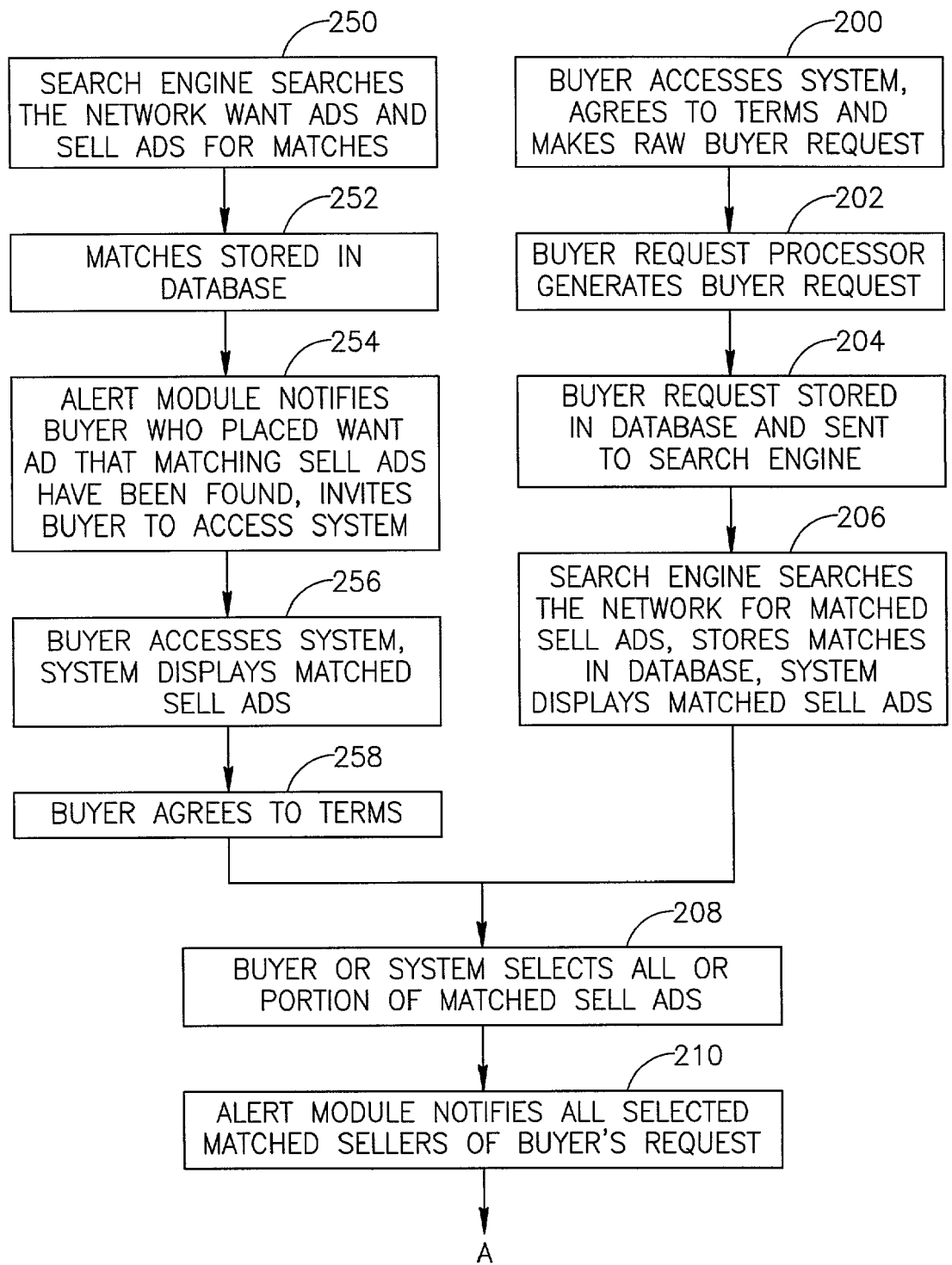
FIG. 2 is a flowchart illustration of a method for using the system of FIG. 1, according to three embodiments of the present invention.
Figure 2B:
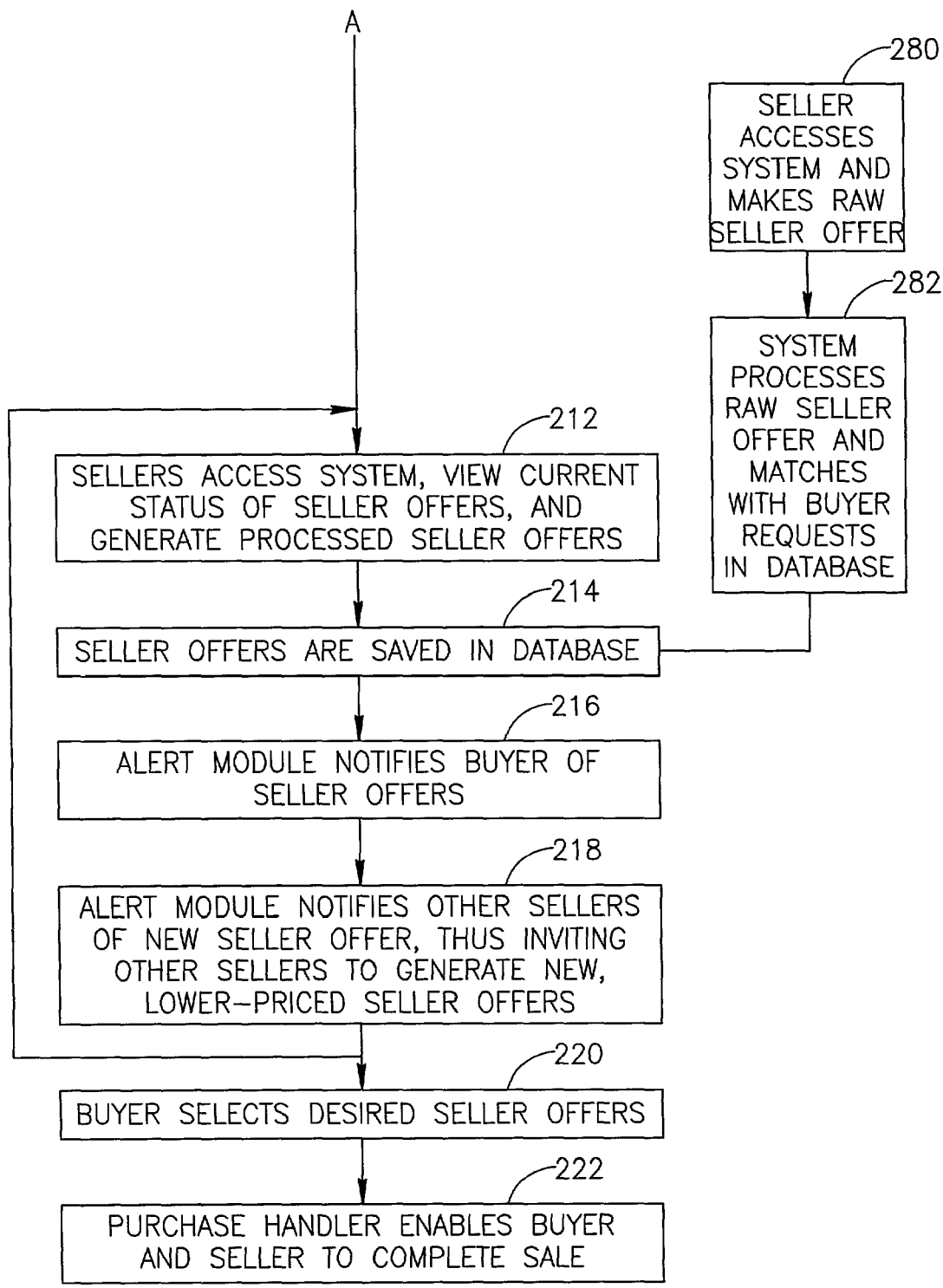

Reference is now made to FIG. 2, which is a flowchart illustration of a method for using the system of FIG. 1 according to three embodiments. In the first embodiment, a buyer accesses the system, agrees to terms of use of the system, and makes a raw buyer request via the HTTP server (step 200). A buyer request, which states what the buyer is looking to buy, may be presented in any of a variety of formats, including a completed online form, an e-mail message, and a recorded voice message. A buyer must provide some form of contact information, for example a name, e-mail address, home or work address and telephone number. A buyer might also specify the proximity of the seller to a geographic location. As a first example, a buyer interested in buying a vacuum cleaner may enter the following description: "Upright vacuum with attachments. Must include extra bags and belt. Up to 5 years old. Good condition!". As a second example, a buyer interested in buying a laptop would specify all or part of the following criteria: category, title, vendor/make, speed, condition, price and warranty. The buyer request processor generates a buyer request (step 202). The buyer request is stored in the database and sent to the search engine (step 204).

The search engine searches the network for matched sell ads (step 206). For example, the search engine searches online classified advertisements posted by sellers. The online classified advertisements are searched to find matches. For example, if the buyer is looking to buy a red sports car from 1995, the search engine will search online classified advertisements for matches.

Buyer requests may be represented by a vector of parameters and compared to a corresponding parameterized seller's ad (auction, classified). The matching unit Will determine a match possibly by using a heuristic algorithm or by using an algorithm based on fuzzy logic or any other algorithm that will determine how close is the match. In other instances buyer requests or sell ads may originate in free text (spoken or written). In these cases sophisticated parsing (and recognition, for spoken text) will be required to transform them into specific format that will allow an intelligent comparison.

The search of the network may be conducted online or offline. According to one embodiment of the present invention, the search of the network is conducted offline. An exhaustive search on all classified advertisement sites is performed, and then sell ads are mapped to a common format and indexed in the database. When a buyer request is received online, the buyer request is matched according to the information in the database. This results in improved time performance. According to another embodiment of the present invention, the search of the network is conducted online. Sell ads are searched immediately upon processing of the buyer request and compared to the buyer request in order to determine whether there is a match. In this embodiment, the sell ads are more up-to-date, but the time performance will be relatively slow. However, the database can save matches for future buyer requests regarding similar items.

The system displays to the buyer via the HTTP server a list of matched sell ads (step 206). This list may be a complete list or may be an edited, partial list. The buyer selects for which of the displayed sell ads the system should contact the seller (step 208). Alternatively, the buyer instructs the system to contact all or a portion of sellers of matched sell ads. Alternatively, the system contacts all or a portion of sellers of matched sell ads without buyer intervention.

The search engine will extract contact information for the matched sellers from the classified advertisements and will send this contact information to the alert module. The alert module will send notifications to the matched sellers, SELLER 1 to SELLER N, that a potential buyer for the product advertised in the classified ad can be reached via the system (step 210). Non-limiting examples of notifications include an e-mail message or a voice message generated by the system, a personalized e-mail or voice mail or voice message generated by the buyer, a pager notification, a phone call from a direct marketing call center, and a text or voice notification to a cellular telephone or personal data assistant (PDA). The notification will include a link to a page posted by the HTTP server. The page will present the current status of seller offers for the particular buyer request.

Through the HTTP server, the sellers can generate processed seller offers, which are saved in the database (steps 212-214). The alert module notifies the buyer that new seller offers exist (step 216). The alert module also notifies the other sellers that a new seller offer exists, thus inviting the other sellers to generate new, lower-priced seller offers (step 218). A bidding process begins which drives the price down or improving other terms of the offer, benefiting the buyer. The buyer selects one or more desired seller offers (step 220), and the purchase handler enables the buyer and the seller to complete the sale (step 222).

According to the second embodiment, the search engine actively searches the network want ads and sell ads for matches (step 250), and stores the matches in the database (step 252). The alert module notifies the buyer who placed a want ad that matching sell ads have been found and invites the buyer to access the system (step 254). The buyer accesses the system and the system displays a list of matched sell ads (step 256). This list may be a complete list or may be an edited, partial list. The buyer agrees to the terms of use of the system (step 258), and the method continues from step 208 as in the first embodiment.

In the third embodiment, sellers initiate the process by accessing the system and making a raw selling offer via the HTTP server (step 280). Seller offer generator and processor processes the raw selling offer and matches it with buyer requests already in the database (step 282). The alert module notifies the buyer of the new seller offer (step 216), and the method continues from step 218 as in the first embodiment.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method of facilitating a transaction using a computer connected to a network to match buyers and sellers, the method comprising:

having said computer search websites on said network for want ads from buyers, said want ads referring to a wanted good or wanted service;

having said computer search websites on said network for sell ads from sellers, said sell ads referring to an advertised good or wanted service;

having said computer match at least one want ad with at least one sell ad based on programmed rules; and notifying the associated buyer who posted said want ad that at least one sell ad has been matched to said want ad.

2. A method according to claim 1 wherein said method further comprises:

notifying the associated seller for each matched sell ad that said notified buyer has requested a good or service similar to the advertised good or advertised service advertised in said matched sell ad.

3. A method according to claim 2 wherein said notifying the associated seller comprises:

inviting said notified seller to access said computer in order to said notified buyer.

* * * * *